United States Patent
Seo et al.

(10) Patent No.: US 9,952,364 B2
(45) Date of Patent: Apr. 24, 2018

(54) OPTICAL FILM AND DISPLAY DEVICE COMPRISING THE SAME

(71) Applicant: LG CHEM, LTD., Seoul (KR)

(72) Inventors: Kyung Chang Seo, Daejeon (KR); Sung-Ho Chun, Daejeon (KR); Dai Seung Choi, Daejeon (KR); Mi Ra Hong, Daejeon (KR); Dong Woo Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/419,178

(22) PCT Filed: Aug. 6, 2013

(86) PCT No.: PCT/KR2013/007082
§ 371 (c)(1),
(2) Date: Feb. 2, 2015

(87) PCT Pub. No.: WO2014/030859
PCT Pub. Date: Feb. 27, 2014

(65) Prior Publication Data
US 2015/0205023 A1    Jul. 23, 2015

(30) Foreign Application Priority Data

Aug. 21, 2012    (KR) .................. 10-2012-0091436
Aug. 5, 2013     (KR) .................. 10-2013-0092759

(51) Int. Cl.
*C09K 19/00*    (2006.01)
*G02B 5/30*     (2006.01)
(Continued)

(52) U.S. Cl.
CPC ......... *G02B 5/3016* (2013.01); *C09D 133/06* (2013.01); *C09D 145/00* (2013.01);
(Continued)

(58) Field of Classification Search
CPC ......... G02F 1/133711; G02F 1/133788; G02F 1/13363; G02B 1/04; C08L 23/18;
(Continued)

(56) References Cited

U.S. PATENT DOCUMENTS 6,582,626 B2    6/2003  Hasebe et al.
2008/0160222 A1*  7/2008  Harding ............. B82Y 30/00
                                              428/1.26
(Continued)

FOREIGN PATENT DOCUMENTS

CN    101918886 A    12/2010
CN    102344817 A    2/2012
(Continued)

OTHER PUBLICATIONS

Suk Hoon Kang, et al.: "Synthesis and Photoisomerization Properties of Polynorbornenes with Azobenzene Chromophores", Bull. Korean Chem. Soc., vol. 23, No. 7, 2002, pp. 957-963.

*Primary Examiner* — Ruiyun Zhang
(74) *Attorney, Agent, or Firm* — Dentons US LLP (57) ABSTRACT

Disclosed therein are an optical film and a display device comprising the same, where the optical film comprises a first optically anisotropic layer including a liquid crystal compound and a second optically anisotropic layer including a photoreactive polymer, thereby securing improved photoreaction rate and excellent liquid crystal alignment.

12 Claims, 2 Drawing Sheets

(51) Int. Cl.
*C09D 145/00* (2006.01)
*G02B 1/04* (2006.01)
*C09D 133/06* (2006.01)

(52) U.S. Cl.
CPC ............ *G02B 1/04* (2013.01); *C08L 2201/56* (2013.01); *C08L 2203/16* (2013.01); *C08L 2205/12* (2013.01); *C08L 2312/06* (2013.01); *Y10T 428/10* (2015.01); *Y10T 428/1005* (2015.01); *Y10T 428/1036* (2015.01); *Y10T 428/3154* (2015.04); *Y10T 428/31924* (2015.04)

(58) Field of Classification Search
CPC ....... Y10T 428/1005; Y10T 428/31855; Y10T 428/1036; C08G 2261/3324; C08G 2261/76; C08G 2261/148; B32B 2457/202
USPC ................ 428/1.1, 1.2, 522, 1.3; 252/299.4; 349/117–119, 127; 526/282
See application file for complete search history.

(56) References Cited

U.S. PATENT DOCUMENTS

| | | |
|---|---|---|
| 2010/0047481 A1 | 2/2010 | Choi et al. |
| 2010/0304124 A1 | 12/2010 | Haenen et al. |
| 2012/0076954 A1* | 3/2012 | Yoo ................ C07C 69/734 428/1.2 |

FOREIGN PATENT DOCUMENTS

| | | | |
|---|---|---|---|
| CN | 102417454 A | | 4/2012 |
| JP | 1180081 A | | 3/1999 |
| JP | 2002-154830 A | | 5/2002 |
| JP | 2008-044989 A | | 2/2008 |
| JP | 2010507831 A | | 3/2010 |
| JP | 2012027471 A | | 2/2012 |
| JP | 201207403 A | | 4/2012 |
| JP | 2013525590 A | | 6/2013 |
| JP | 2013530414 A | | 7/2013 |
| KR | 10-2011-0025377 A | | 3/2011 |
| KR | 20110025377 A | * | 3/2011 |
| WO | 2005/015298 A1 | | 2/2005 |
| WO | 2012/044020 A2 | | 4/2012 |
| WO | 2012/064141 A2 | | 5/2012 |

* cited by examiner

OPTICAL FILM AND DISPLAY DEVICE COMPRISING THE SAME

This application is a National Stage entry of International Application No. PCT/KR2013/007082 filed on Aug. 6, 2013, which claims priority to Korean Patent Application Nos. 10-2012-0091436 filed on Aug. 21, 2012 and 10-2013-0092759 filed on Aug. 5, 2013, with the Korean Intellectual Property Office, all of which are incorporated herein in their entirety by reference.

FIELD OF THE INVENTION

The present invention relates to an optical film and a display device using the same. More particularly, the present invention relates to an optical film with excellent liquid crystal arrangement and improved photoreaction rate, and a display device using the same.

BACKGROUND ART

With a recent advent of large-sized LCDs and a gradual expansion of their usage from portable devices, such as mobile phones, lap-top computers, etc., to home appliances, such as wall mounted flat panel TVs, there is a demand for LCDs with high definition and wide viewing angle. In particular, TFT-driven thin film transistor LCDs (TFT-LCDs) of which the individual pixels are independently driven are much superior in response speed of liquid crystals, realizing high-definition motion pictures, and thus increasingly used in a wider range of applications.

To be used as an optical switch in the TFT-LCDs, liquid crystals are required to initially align in a defined direction on a layer including innermost TFT of the display cell. For this, a liquid crystal alignment layer is used.

For the liquid crystal alignment to occur, a heat-resistant polymer such as polyimide is applied on a transparent glass to form a polymer alignment layer, which is then subjected to a rubbing process using a rotary roller wound with a rubbing cloth of nylon or rayon fabrics at a high rotation speed to align liquid crystals.

However, the rubbing process remains mechanical scratches on the surface of the liquid crystal alignment layer or generates strong static electricity, possibly destroying the TFTs. Moreover, fine fibers coming from the rubbing cloth may cause defectives, imposing an obstacle to acquiring a higher production yield.

To overcome the problems with the rubbing process and achieve innovation in the aspect of production yield, there has been derived a liquid crystal alignment (hereinafter, referred to as "photo-alignment") method using a light such as UV radiation.

Photo-alignment refers to the mechanism using a linearly polarized UV radiation to cause the photoreactive groups of a defined photoreactive polymer to participate in a photo-reaction, ending up with the main chain of the polymer aligned in a defined direction to form a photo-polymerized liquid crystal alignment layer with aligned liquid crystals.

The representative example of the photo-alignment is photopolymerization-based photo-alignment as disclosed by M. Schadt et al. (Jpn. J. Appl. Phys., Vol 31, 1992, 2155), Dae S. Kang et al. (U.S. Pat. No. 5,464,669), and Yuriy Reznikov (Jpn. J. Appl. Phys. Vol. 34, 1995, L1000). The photo-aligned polymers used in these patent and research papers are mostly polycinnamate-based polymers, such as poly(vinylcinnamate) (PVCN) or poly(vinyl methoxycinnamate) (PVMC). For photo-alignment of polymers, the double bond of cinnamate exposed to UV radiation participates in a [2+2] cycloaddition reaction to form cyclobutane, which provides anisotropy to cause liquid crystal molecules aligned in one direction, inducing liquid crystal alignment.

Besides, JP11-181127 discloses a polymer and an alignment layer including the same in which the polymer has a side chain including photoreactive groups such as cinnamate on a main chain such as acrylate, methacrylate, etc. Korean Patent Laid-Open Publication No. 2002-0006819 also discloses the use of an alignment layer comprising a polymethacryl-based polymer.

Such conventional photoreactive polymers for alignment layer, however, have their polymer main chain with low thermal stability and thus undesirably contribute to deterioration in the stability of the alignment layer or poor characteristics regarding photoreactivity, liquid crystal alignment, or alignment rate. For example, polymers with an acryl-based main chain have low thermal stability, which contributes to a great deterioration in the stability of the alignment layer, while polymers with photosensitive groups belonging in the main chain cannot rapidly react to the polarized light irradiated on the alignment layer and thus deteriorate liquid crystal alignment or alignment rate. Such deterioration in liquid crystal alignment or alignment rate causes reduced process efficiency or contributes to insufficient liquid crystal alignment of the LCDs, leading to lower dichroic ratio and poor contrast.

On the other hand, Bull. Korean Chem. Soc. 2002, Vol. 23, 957 discloses a photoreactive polymer containing a repeating unit bound to an azo group as a part of the repeating units. However, such a photoreactive polymer also has poor alignment and low photoreaction rate and still results in low process efficiency and poor contrast of the LCDs.

SUMMARY OF THE INVENTION

To solve the problems with the prior art, it is an object of the present invention to provide an optical film with excellent liquid crystal alignment and improved photoreaction rate.

It is another object of the present invention to provide a display device including the liquid crystal film.

To achieve the objects of the present invention, there is provided an optical film comprising: a first optically anisotropic layer comprising at least one liquid crystal compound represented by the following Formula 1; and a second optically anisotropic layer comprising a photoreactive polymer including a repeating unit represented by the following Formula 2a or 2b:

$$A_1\text{-}Ar_1\text{-}E_1\text{-}Ar_2\text{-}E_2\text{-}Ar_3\text{-}A_2 \qquad \text{[Formula 1]}$$

wherein $Ar_1$, $Ar_2$ and $Ar_3$ are the same as or different from one another and independently an arylene having 6 to 40 carbon atoms, wherein the arylene can be substituted by an alkyl having 1 to 10 carbon atoms or halogen substitute;

$E_1$ and $E_2$ are the same as or different from each other and independently a simple bond, —C(=O)—, —OC(=O)—, —C(=O)O—, or an alkylene having 1 to 10 carbon atoms; and $A_1$ and $A_2$ are the same as or different from each other and independently represented by the following Formula 1a:

In the Formula 1a, Gm, Lm and Nm are the same as or different from one another and independently a simple bond, —O—, —S—, —C(=O)—, —C(=O)O—, —OC(=O)—, —OC(=O)O—, —C(=O)NR—, —NRC(=O)—, —NRC(=O)NR—, —OCH₂—, —CH₂O—, —SCH₂—, —CH₂S—, —CF₂O—, —OCF₂—, —CF₂S—, —SCF₂—, —CH₂—, —(CH₂)₂—, —(CH₂)₃—, —(CH₂)₄—, —CF₂CH₂—, —CH₂CF₂—, or —CF₂CF₂—, wherein R is hydrogen or a alkylene having 1 to 10 carbon atoms;

Jm and Mm are the same as or different from each other and independently a simple bond, an alkylene having 1 to 10 carbon atoms, or a cycloalkylene having 3 to 10 carbon atoms; and Qm is an alkyl having 1 to 10 carbon atoms, acrylate, methacrylate, or epoxy group;

[Formula 2a]

[Formula 2b]

The substituents of the Formula 2a or 2b are as described below in detail.

The present invention also provides a display device comprising the optical film.

According to the present invention, it is possible to provide an optical film with excellent liquid crystal alignment and improved photoreaction rate and a display device comprising the same.

DETAILED DESCRIPTION OF THE PREFERRED EMBODIMENT

It will be understood that, although the terms "first", "second", etc. may be used herein to describe various elements, they are only used to distinguish one element from another.

It will also be understood that when a layer or an element is referred to as being "on" another layer or element, it can be directly on the other layer or element, or intervening layers or elements may be present therebetween.

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It be further understood that the terms "comprises", "comprising," "includes", "including", and/or "have/has/having", when used herein, specify the presence of stated features, steps, components, and/or groups thereof but do not preclude the presence or addition of one or more other features, steps, components, and/or groups thereof.

While example embodiments of the present invention are susceptible to various modifications and alternative forms, specific embodiments thereof will be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention.

Hereinafter, a detailed description will be given as to an optical film and a display device according to the present invention.

Optical Film

The optical film of the present invention comprises: a first optically anisotropic layer comprising at least one liquid crystal compound represented by the following Formula 1; and a second optically anisotropic layer comprising a photoreactive polymer including a repeating unit represented by the following Formula 2a or 2b:

A₁-Ar₁-E₁-Ar₂-E₂-Ar₃-A₂    [Formula 1]

In the Formula 1, Ar₁, Ar₂ and Ar₃ are the same as or different from one another and independently an arylene having 6 to 40 carbon atoms, wherein the arylene can be substituted by an alkyl having 1 to 10 carbon atoms or halogen substitute;

E₁ and E₂ are the same as or different from each other and independently a simple bond, —C(=O)—, —OC(=O)—, —C(=O)O—, or an alkylene having 1 to 10 carbon atoms; and

A₁ and A₂ are the same as or different from each other and independently represented by the following Formula 1a:

-Gm-Jm-Lm-Mm-Nm-Qm    [Formula 1a]

In the Formula 1a, Gm, Lm and Nm are the same as or different from one another and independently a simple bond, —O—, —S—, —C(=O)—, —C(=O)O—, —OC(=O)—, —OC(=O)O—, —C(=O)NR—, —NRC(=O)—, —NRC(=O)NR—, —OCH₂—, —CH₂O—, —SCH₂—, —CH₂S—, —CF₂O—, —OCF₂—, —CF₂S—, —SCF₂—, —CH₂—, —(CH₂)₂—, —(CH₂)₃—, —(CH₂)₄—, —CF₂CH₂—, —CH₂CF₂—, or —CF₂CF₂—, wherein R is hydrogen or an alkylene having 1 to 10 carbon atoms;

Jm and Mm are the same as or different from each other and independently a simple bond, an alkylene having 1 to 10 carbon atoms, or a cycloalkylene having 3 to 10 carbon atoms; and Qm is an alkyl having 1 to 10 carbon atoms, acrylate, methacrylate, or epoxy group;

[Formula 2a]

[Formula 2b]

In the Formula 2a or 2b, independently,
q is an integer from 0 to 4;
m is an integer from 50 to 5,000; and
at least one of R1, R2, R3 and R4 is any one selected from the group consisting of radicals of the following Formula 3a or 3b.

Among the R1 to R4, the remainders other than the radical of the Formula 3a or 3b are the same as or different from one another and independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; and a polar functional group comprising at least one of oxygen, nitrogen, phosphor, sulfur, silicon, and boron.

When the R1 to R4 are not hydrogen, halogen, or a polar functional group, at least one selected from the group consisting of a R1 and R2 coordination and a R3 and R4 coordination is bonded together to form an alkylidene group having 1 to 10 carbon atoms; or R1 or R2 is bonded to either R3 or R4 to form a saturated or unsaturated aliphatic ring having 4 to 12 carbon atoms or an aromatic ring having 6 to 24 carbon atoms.

[Formula 3a]

[Formula 3b]

In the Formula 3a or 3b,
A is simple bond, oxygen, sulfur, or —NH—;
B is selected from the group consisting of simple bond, substituted or unsubstituted alkylene having 1 to 20 carbon atoms, carbonyl, carboxy, ester, substituted or unsubstituted arylene having 6 to 40 carbon atoms, and substituted or unsubstituted heteroarylene having 6 to 40 carbon atoms;
X is oxygen or sulfur;

R9 is selected from the group consisting of simple bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted aralkylene having 7 to 15 carbon atoms, and substituted or unsubstituted alkynylene having 2 to 20 carbon atoms;

at least one of R10 to R14 is a radical represented by -L-R15-R16- (substituted or unsubstituted C6-C40 aryl), where among the R10 to R14, the remainders other than the radical of -L-R15-R16-(substituted or unsubstituted C6-C40 aryl) are the same as or different from one another and independently selected from the group consisting of hydrogen; halogen; substituted or unsubstituted alkyl having 1 to 20 carbon atoms; substituted or unsubstituted alkoxy having 1 to 20 carbon atoms; substituted or unsubstituted aryloxy having 6 to 30 carbon atoms; substituted or unsubstituted aryl having 6 to 40 carbon atoms; and heteroaryl having 6 to 40 carbon atoms with a hetero element in Group 14, 15 or 16;

L is selected from the group consisting of oxygen, sulfur, —NH—, substituted or unsubstituted alkylene having 1 to 20 carbon atoms, carbonyl, carboxy, —CONH—, and substituted or unsubstituted arylene having 6 to 40 carbon atoms;

R15 is substituted or unsubstituted alkyl having 1 to 10 carbon atoms; and

R16 is selected from the group consisting of simple bond, —O—, —C(=O)O—, —OC(=O)—, —NH—, —S—, and —C(=O)—.

The radical of -L-R15-R16-(substituted or unsubstituted C6-C40 aryl) may be represented by the following Formula 4:

[Formula 4]

In the Formula 4, R15 and R16 are as defined in Formulae 3a and 3b; and

R17 to R21 are the same as or different from one another and independently selected from the group consisting of hydrogen; halogen; substituted or unsubstituted alkyl having 1 to 20 carbon atoms; substituted or unsubstituted alkoxy having 1 to 20 carbon atoms; substituted or unsubstituted aryloxy having 6 to 30 carbon atoms; substituted or unsubstituted aryl having 6 to 40 carbon atoms; heteroaryl having 6 to 40 carbon atoms with a hetero element in Group 14, 15 or 16; and substituted or unsubstituted alkoxyaryl having 6 to 40 carbon atoms.

According to one example of the present invention, the polar functional group may be selected from the group consisting of the following functional groups:

—$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)p$-$OR_6$, —$(OR_5)p$-$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$,

—R₅N=C=S, —N=C=S, —NCO, —R₅—NCO, —CN, —R₅CN, —NNC(=S)R₆, —R₅NNC(=S)R₆, —NO₂, —R₅NO₂,

In the polar functional group, independently, p is an integer from 1 to 10;

R5 is substituted or unsubstituted linear or branched alkylene having 1 to 20 carbon atoms; substituted or unsubstituted linear or branched alkenylene having 2 to 20 carbon atoms; substituted or unsubstituted linear or branched alkynylene having 2 to 20 carbon atoms; substituted or unsubstituted cycloalkylene having 3 to 12 carbon atoms; substituted or unsubstituted arylene having 6 to 40 carbon atoms; substituted or unsubstituted carbonyloxylene having 1 to 20 carbon atoms; or substituted or unsubstituted alkoxylene having 1 to 20 carbon atoms; and R6, R7 and R8 are independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; substituted or unsubstituted alkoxy having 1 to 20 carbon atoms; and substituted or unsubstituted carbonyloxy having 1 to 20 carbon atoms.

Further, the substituted or unsubstituted aryl having 6 to 40 carbon atoms or the heteroaryl having 6 to 40 carbon atoms with a hetero element in Group 14, 15 or 16 may be selected from the group consisting of the following functional groups:

In these Formulae, R'10 to R'18 are the same as or different from one another and independently selected from the group consisting of substituted or unsubstituted linear or branched alkyl having 1 to 20 carbon atoms; substituted or unsubstituted alkoxy having 1 to 20 carbon atoms; substituted or unsubstituted aryloxy having 6 to 30 carbon atoms; and substituted or unsubstituted aryl having 6 to 40 carbon atoms.

In the above-described Formulae, the individual substituents may be specifically defined as follows:

The term "alkyl" as used herein refers to a monovalent linear or branched saturated hydrocarbon portion having 1 to 20 carbon atoms, preferably 1 to 10 carbon atoms, more preferably 1 to 6 carbon atoms. The alkyl group may be arbitrarily substituted by at least one halogen substituent. The examples of the alkyl group may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

The term "alkenyl" as used herein refers to a monovalent linear or branched hydrocarbon portion having 2 to 20 carbon atoms, preferably 2 to 10 carbon atoms, more preferably 2 to 6 carbon atoms with at least one carbon-carbon double bond. The alkenyl group may form a bonding through carbon atoms including a carbon-carbon double bond or through saturated carbon atoms. The alkenyl group may be arbitrarily substituted by at least one halogen substituent. The examples of the alkenyl group may include ethenyl, 1-propenyl, 2-propenyl, 2-butenyl, 3-butenyl, pentenyl, 5-hexenyl, dodecenyl, etc.

The term "cycloalkyl" as used herein refers to a monovalent saturated or unsaturated mono-, bi- or tri-cyclic non-aromatic hydrocarbon portion having 3 to 12 ring-carbon atoms. The cycloalkyl group may be arbitrarily substituted by at least one halogen substituent. The examples of the cycloalkyl group may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (i.e., bicyclo[2,2,1]hept-5-enyl), etc.

The term "aryl" as used herein refers to a monovalent mono-, bi- or tri-cyclic aromatic hydrocarbon portion having 6 to 40 ring-carbon atoms, preferably 6 to 12 ring-carbon atoms. The aryl group may be arbitrarily substituted by at least one halogen substituent. The examples of the aryl group may include phenyl, naphthalenyl, fluorenyl, etc.

The term "alkoxyaryl" as used herein refers to a radical in which an alkoxy group is substituted for at least one hydrogen atom of the above-defined aryl group. The examples of the alkoxyaryl group may include methoxyphenyl, ethoxyphenyl, propoxyphenyl, butoxyphenyl, pentoxyphenyl, hextoxyphenyl, heptoxy, octoxy, nanoxy, methoxybiphenyl, methoxynaphthalenyl, methoxyfluorenyl, methoxyanthracenyl, ethoxyanthracenyl, propoxyanthracenyl, etc.

The term "aralkyl" as used herein refers to a radical in which an aryl group is substituted for at least one hydrogen atom of the above-defined alkyl group. The aralkyl group may be arbitrarily substituted by at least one halogen substituent. The examples of the aralkyl group may include benzyl, benzhydryl, trityl, etc.

The term "alkynyl" as used herein refers to a monovalent linear or branched hydrocarbon portion having 2 to 20 carbon atoms, preferably 2 to 10 carbon atoms, more preferably 2 to 6 carbon atoms with at least one carbon-carbon triple bond. The alkynyl group may form a bonding through carbon atoms including a carbon-carbon triple bond or through saturated carbon atoms. The alkynyl group may be arbitrarily substituted by at least one halogen substituent. The examples of the alkynyl group may include ethynyl, propynyl, etc.

The term "alkylene" as used herein refers to a divalent linear or branched saturated hydrocarbon portion having 1 to 20 carbon atoms, preferably 1 to 10 carbon atoms, more preferably 1 to 6 carbon atoms. The alkylene group may be arbitrarily substituted by at least one halogen substituent. The examples of the alkylene group may include methylene, ethylene, propylene, butylene, hexylene, etc.

The term "alkenylene" as used herein refers to a divalent linear or branched hydrocarbon portion having 2 to 20 carbon atoms, preferably 2 to 10 carbon atoms, more preferably 2 to 6 carbon atoms with at least one carbon-carbon double bond. The alkenylene group may form a bonding through carbon atoms including a carbon-carbon double bond and/or through saturated carbon atoms. The alkenylene group may be arbitrarily substituted by at least one halogen substituent.

The term "cycloalkylene" as used herein refers to a divalent saturated or unsaturated mono-, bi- or tri-cyclic non-aromatic hydrocarbon portion having 3 to 12 ring-carbon atoms. The cycloalkylene group may be arbitrarily substituted by at least one halogen substituent. The examples of the cycloalkylene group may include cyclopropylene, cyclobutylene, etc.

The term "arylene" as used herein refers to a divalent mono-, bi- or tri-cyclic aromatic hydrocarbon portion having 6 to 20 ring-carbon atoms, preferably 6 to 12 ring-carbon atoms. The arylene group may be arbitrarily substituted by at least one halogen substituent. The aromatic portion of the arylene group includes carbon atoms only. The examples of the arylene group may include phenylene, etc.

The term "aralkylene" as used herein refers to a divalent radical in which an aryl group is substituted for at least one hydrogen atom of the above-defined alkyl group. The aralkylene group may be arbitrarily substituted by at least one halogen substituent. The examples of the aralkylene group may include benzylene, etc.

The term "alkynylene" as used herein refers to a divalent linear or branched hydrocarbon portion having 2 to 20 carbon atoms, preferably 2 to 10 carbon atoms, more preferably 2 to 6 carbon atoms with at least one carbon-carbon triple bond. The alkynylene group may form a bonding through carbon atoms including a carbon-carbon triple bond or through saturated carbon atoms. The alkynylene group may be arbitrarily substituted by at least one halogen substituent. The examples of the alkynylene group may include ethynylene, propynylene, etc.

The photoreactive polymer including a repeating unit represented by the chemical Formula 2a or 2b may have a large free space secured between the photoreactive groups due to the bulky aralkyl structure bonded to the terminal of the photoreactive groups via a linker L. For this reason, photoreactive groups in the photoreactive polymer are relatively free to move (flow) or react in such a large free volume. This allows the photoreactive polymer to have excellences in photoreactivity, alignment rate, and photo-alignment. Also, the photoreactive groups of the photoreactive polymer are relatively free to change the alignment direction depending on the change in the polarization direction. Therefore, the alignment direction may be easily changed according to the polarization direction, and the photoreactive polymer can be preferably applied to patterned retarders, patterned cell alignment layers, or the like.

The repeating unit of the Formula 2a or 2b as included in the photoreactive polymer is structurally sturdy, and the glass transition temperature Tg of the photoreactive polymer including such a repeating unit is as high as 300° C. or above, preferably about 300° C. to about 350° C., which implies that the photoreactive polymer is superior in thermal stability to the existing photoreactive polymers.

Further, the repeating unit of the Formula 2a or 2b in the photoreactive polymer has the degree of polymerization in the range of about 50 to 5,000, preferably about 100 to 4,000, more preferably about 1,000 to 3,000. And, the photoreactive polymer has a weight average molecular weight of 10,000 to 1,000,000, preferably 20,000 to 500,000. Therefore, the photoreactive polymer properly included in a coating composition for forming an alignment layer provides the coating composition with good coatability and the alignment layer formed from the coating composition with good liquid crystal alignment.

The photoreactive polymer may be endowed with photoreactivity upon exposure to a polarized radiation having a wavelength of about 150 to 450 nm. For example, the photoreactive polymer can exhibit excellences in photoreactivity and alignment upon exposure to polarized UV radiation having a wavelength of about 200 to 400 nm, more specifically about 250 to 350 nm.

According to one exemplary embodiment of the present invention, the photoreactive polymer including a repeating unit represented by the Formula 2a or 2b may further comprise a photoactivator, a (meth)acrylate-based compound, and a photoinitiator.

The addition of the photoactivator to the photoreactive polymer may promote the reactivity of the photoreactive groups. The examples of the photoactivator as used herein may include 2,4-ethyl-9H-thioxanthen-9-one, 1-isopropyl-9H-thioxanthen-9-one, 1,3-difluoro-9H-thioxanthen-9-one, 2-trifluoromethyl-9H-thioxanthen-9-one, etc.

The (meth)acrylate-based compound as used herein may comprise, for example, at least one selected from the group consisting of pentaerythritol triacrylate, tris(2-acrylolyloxyethyl)isocynurate, trimethylolpropane triacrylate, and dipentaerythritol hexaacrylate.

The photoinitiator as used herein may include, but are not limited to, Irgacure 907 or 819.

According to one exemplary embodiment of the present invention, the optical film may comprise, based on the total weight of the composition, 50 to 70 wt % of the photoreactive polymer including a repeating unit represented by the Formula 2a or 2b; 1 to 20 wt % of the photoactivator; 20 to 40 wt % of the (meth)acrylate-based compound; and 1 to 15 wt % of the photoinitiator.

The optical film of the present invention may comprise a first optically anisotropic layer which comprises a liquid crystal compound.

The liquid crystal compound of the first optically anisotropic layer may comprise at least one compound represented by the following Formula 1:

$$A_1\text{-}Ar_1\text{-}E_1\text{-}Ar_2\text{-}E_2\text{-}Ar_3\text{-}A_2 \quad \text{[Formula 1]}$$

In the Formula 1, $Ar_1$, $Ar_2$ and $Ar_3$ are the same as or different from one another and independently an arylene having 6 to 40 carbon atoms, wherein the arylene can be substituted by an alkyl having 1 to 10 carbon atoms or halogen substitute;

$E_1$ and $E_2$ are the same as or different from each other and independently a simple bond, —C(=O)—, —OC(=O)—, —C(=O)O—, or an alkylene having 1 to 10 carbon atoms; and $A_1$ and $A_2$ are the same as or different from each other and independently represented by the following Formula 1a:

Gm-Jm-Lm-Mm-Nm-Qm         [Formula 1a]

In the Formula 1a, Gm, Lm and Nm are the same as or different from one another and independently a simple bond, —O—, —S—, —C(=O)—, —C(=O)O—, —OC(=O)—, —OC(=O)O—, —C(=O)NR—, —NRC(=O)—, —NRC(=O)NR—, —OCH₂—, —CH₂O—, —SCH₂—, —CH₂S—, —CF₂O—, —OCF₂—, —CF₂S—, —SCF₂—, —CH₂—, —(CH₂)₂—, —(CH₂)₃—, —(CH₂)₄—, —CF₂CH₂—, —CH₂CF₂—, or —CF₂CF₂—, wherein R is hydrogen or an alkylene having 1 to 10 carbon atoms;

Jm and Mm are the same as or different from each other and independently a simple bond, an alkylene having 1 to 10 carbon atoms, or a cycloalkylene having 3 to 10 carbon atoms; and Qm is an alkyl having 1 to 10 carbon atoms, acrylate, methacrylate, or epoxy group.

According to one example of the present invention, the first optically anisotropic layer may further comprise at least one monoacrylate-based compound in addition to the liquid crystal compound of the Formula 1.

According to one exemplary embodiment of the present invention, the monoacrylate-based compound may be at least one selected from the group consisting of the following compounds, where z in the following Formulae represents an integer from 2 to 12:

The physical characteristics, such as alignment, photoreactivity, or the like, that are required for optical films are determined by the interaction between the liquid crystal compound included in the first optically anisotropic layer and the photoreactive polymer included in the second optically anisotropic layer. Therefore, such an interaction may be dependent upon the structural characteristics of the liquid crystal compound and the photoreactive polymer.

The optical film of the present invention comprises, as individual layers, the liquid crystal compound represented by the Formula 1 and the photoreactive polymer including a repeating unit represented by the Formula 2. Hence, the liquid crystal compound and the photoreactive polymer are combined together without unnecessary interactions occurring in the case that they are included in a single layer, thereby securing excellent alignment and high photoreactivity by way of an appropriate binding force. This leads to providing an optical film with improved liquid crystal alignment and photoreaction rate.

The optical film of the present invention may be fabricated according to a typical method as known to those skilled in the art. For fabrication of the optical film, a composition comprising a photoreactive polymer including a repeating unit represented by the Formula 2a or 2b, a photoactivator, a (meth)acrylate-based compound as a binder, and a photoinitiator is dissolved in a proper organic solvent to prepare a solution. The organic solvent as used herein may include, but are not limited to, toluene, anisole, chlorobenzene, dichloroethane, cyclohexane, cyclopentane, propylene glycol methyl ether acetate, etc.

In this regard, the solid proportion of the solution may be about 1 wt % to about 15 wt % with respect to the weight of the solution. For casting the solution into a film, for example, the solid portion is preferably about 10 wt % to about 15 wt %; for casting the solution into a thin film, the solid portion is preferably about 1 wt % to about 5 wt %.

The solution thus prepared is applied dropwise onto a substrate or a glass, subjected to spin coating, bar coating, solvent casting, or the like and then dried out in an oven or on a hot plate. Subsequently, the solution is exposed to a polarized UV radiation so that the double bond of the photoreactive groups form a dimer in defined direction to form the second optically anisotropic layer.

A solution containing the liquid crystal compound represented by the Formula 1 may be applied onto the second optically anisotropic layer by coating and dried out to form a first optically anisotropic layer.

In this regard, the solution may be prepared by dissolving the liquid crystal compound and the photoinitiator in an organic solvent. The content of the liquid crystal compound in the liquid crystal compound solution is not specifically limited and may be, based on 100 parts by weight of the liquid crystal compound solution, about 5 parts by weight to about 70 parts by weight, preferably about 5 parts by weight to about 50 parts by weight.

Further, a photoinitiator, a chelating agent, a surfactant, a monomer for polymerization, a polymer, etc. may be added to the liquid crystal compound solution unless the addition interferes with the liquid crystal alignment.

In the preparation of the liquid crystal compound solution, the organic solvent may include, but are not limited to, halogenated hydrocarbons, such as chloroform, tetrachloroethane, trichloroethane, tetrachloroethylene, chlorobenzene, etc.; aromatic hydrocarbons, such as benzene, toluene, xylene, methoxy benzene, 1,2-dimethoxy benzene, etc.; ketones, such as acetone, methylethylketone, cyclohexanone, cyclopentanone, etc.; alcohols, such as isopropyl alcohol, n-butanol, etc.; or cellosolves, such as methyl cellosolve, ethyl cellosolve, butyl cellosolve, etc., which organic solvents may be used alone or in a mixture thereof.

Display Device

The present invention also provides a display device comprising the optical film.

The optical film according to the present invention may be used as an optical member for liquid crystal display devices. The examples of the optical member may include phase contrast films for STN (Super Twist Nematic) LCD, TFT-TN (Thin Film Transistor-Twisted Nematic) LCD, VA (Vertical Alignment) LCD, IPS (In-Plane Switching) LCD, etc.; ½ wave plates; ¼ wave plates; reverse wavelength dispersion type films; optical compensation films; color films; laminated films with a polarizing plate; compensation films for polarizing plate, etc.

The display device of the present invention may comprise one or two of the optical film.

In a display device comprising a liquid crystal cell and first and second polarizing plates each provided on either side of the liquid crystal cell, for example, the optical film of the present invention may be provided between the liquid crystal cell and the first polarizing plate and/or the second polarizing plate. In other words, at least one of the optical film may be provided between the first polarizing plate and the liquid crystal cell; between the second polarizing plate and the liquid crystal cell; or both between the first polarizing plate and the liquid crystal cell and between the second polarizing plate and the liquid crystal cell.

The display device of the present invention may be prepared according to a typical method known to those skilled in the related art.

According to one example of the present invention, the display device may be prepared by the steps of: preparing first and second substrates as substrate materials; forming a second optically anisotropic layer on the substrates; drying the second optically anisotropic layer formed on the substrates; exposing the dried second optically anisotropic layer to UV radiation to acquire optical alignment; forming a first optically anisotropic layer on the second optically anisotropic layer; and binding the two substrates together to interpose a liquid crystal layer between the two substrates.

More specifically, a composition comprising a photoreactive polymer including a repeating unit of the Formula 2a or 2b, a photoactivator, a (meth)acrylate-based compounds as a binder, and a photoinitiator is dissolved in an appropriate organic solvent, and the resultant solution is applied on the substrates and dried out.

After completion of the drying, a UV radiation linearly polarized in a defined direction is applied on the substrate to acquire alignment in an arbitrary direction. This induces the first molecular alignment in the direction (i.e., absorption direction) perpendicular to the transmission axis of the UV polarizing plate (i.e., wire grid polarizing plate) through UV-driven dimerization of the photoreactive polymer constituting the optically anisotropic layer. In this regard, the alignment direction of the optically anisotropic layer can be controlled to a desired angle by adjusting the polarizing direction of the UV radiation applied. Hence, the optical axis of the first optically anisotropic layer that will be formed later on the second optically anisotropic layer can be controlled to a desired angle with respect to the lengthwise direction of the substrates.

UV light generated from a high-voltage mercury lamp with an intensity of 200 mW/cm$^2$ and polarized perpendicular to the lengthwise direction of the film using a wire grid polarizer (manufactured by Moxtek Inc.) was irradiated on the substrate for 5 sec. to impose alignment and form a second optically anisotropic layer.

A solid portion comprising 95.0 wt % of RM257 of the Formula 5 and 5.0 wt % of Irgacure 907 (manufactured by Ciba-Geigy, Switzerland) was dissolved in toluene to contain 25 parts by weight of the liquid crystal per 100 parts by weight of the liquid crystal solution, thereby preparing a polymerizable reactive liquid crystal solution.

[Formula 5]

A solution comprising a liquid crystal compound is applied onto the first optically anisotropic layer and then dried out to form a first optically anisotropic layer.

After the drying step, the first optically anisotropic layer aligned on the second optically anisotropic layer is subjected to polymerization upon exposure to UV radiation and then set by curing.

Subsequently, a photoreactive adhesive containing a ball spacer is applied on the end of either one of the two substrates having the optical film of the present invention. The substrate is combined with the other substrate, and only the adhesive side is exposed to UV radiation to complete a cell by bonding. Liquid crystal is injected into the cell, which is then subjected to heat treatment to complete a display device.

The display device of the present invention that has the optical film exhibits excellent liquid crystal alignment and high photoreaction rate.

Figure 1:
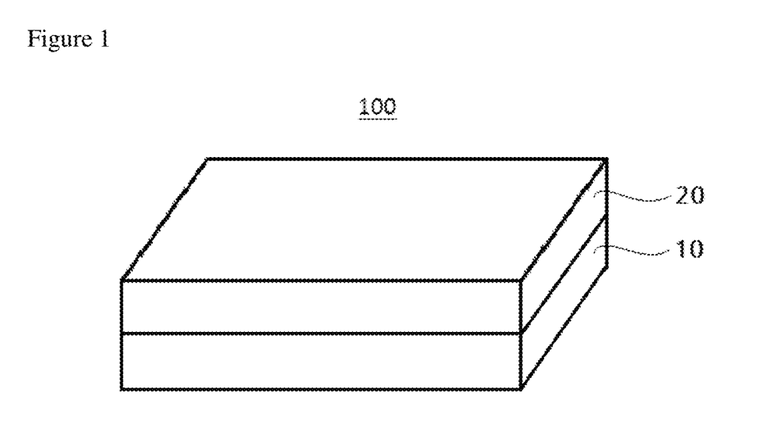
FIG. 1 is a perspective showing an optical film according to one embodiment of the present invention.

FIG. 1 is an illustration of an optical film prepared according to one example of the present invention.

Referring to FIG. 1, the optical film 100 according to one example of the present invention may comprise a first optically anisotropic layer 20 and a second optically anisotropic layer 10.

In the following are set forth preferred examples of the invention for better understanding of the invention. It is to be understood that the examples are only for illustrative purposes and are not intended to limit the scope of the invention.

EXAMPLES

Example 1

5-norbornene-2-ethyl-(4-benzyloxy cinnamate) polymer (Mw: 159 k) was dissolved in c-pentanone solvent at concentration of 2 wt %, and the resultant solution was applied onto a 8 μm-thick polyethylene terephthalate (trade name: SH61, manufactured by SKC Inc., S. Korea) substrate to a dry-film thickness of 1,000 Å by roll coating. Then, the substrate was heated in an oven at 80° C. for 3 minutes to eliminate the solvent from the inside of the coating layer and complete the coating layer.

The liquid crystal solution thus prepared was applied on the second optically anisotropic layer to a dry-film thickness of 1 μm by roll coating and then dried at 80° C. for 2 minutes to acquire alignment of liquid crystal molecules and prepare a first optically anisotropic layer. Non-polarized UV light generated from a high-voltage mercury lamp with an intensity of 200 mW/cm$^2$ was irradiated on the aligned first optically anisotropic layer to set the alignment status of the liquid crystals, thereby completing an optical film including first and second optically anisotropic layers.

Example 2

The procedures were performed to prepare an optical film in the same manner as described in Example 1, excepting that 5-norbornene-2-ethyl-(4-fluorobenzyloxy cinnamate) polymer (Mw: 144 k) was used in place of the 5-norbornene-2-ethyl-(4-benzyloxy cinnamate) polymer.

Example 3

The procedures were performed to prepare an optical film in the same manner as described in Example 1, excepting that 5-norbornene-2-ethyl-(4-methyl benzyloxy cinnamate) polymer (Mw: 130 k) was used in place of the 5-norbornene-2-ethyl-(4-benzyloxy cinnamate) polymer.

Example 4

The procedures were performed to prepare an optical film in the same manner as described in Example 1, excepting that 5-norbornene-2-ethyl-(4-methoxy benzyloxy cinnamate) polymer (Mw: 102 k) was used in place of the 5-norbornene-2-ethyl-(4-benzyloxy cinnamate) polymer.

Example 5

The procedures were performed to prepare an optical film in the same manner as described in Example 1, excepting that 5-norbornene-2-ethyl-(4-methylketone benzyloxy cinnamate) polymer (Mw: 87 k) was used in place of the 5-norbornene-2-ethyl-(4-benzyloxy cinnamate) polymer.

Example 6

The procedures were performed to prepare an optical film in the same manner as described in Example 1, excepting that RM257-4 of the following Formula 6 was used in place of RM257:

[Formula 6]

Example 7

The procedures were performed to prepare an optical film in the same manner as described in Example 2, excepting that RM257-4 was used in place of RM257.

Example 8

The procedures were performed to prepare an optical film in the same manner as described in Example 3, excepting that RM257-4 was used in place of RM257.

Example 9

The procedures were performed to prepare an optical film in the same manner as described in Example 4, excepting that RM257-4 was used in place of RM257.

Example 10

The procedures were performed to prepare an optical film in the same manner as described in Example 5, excepting that RM257-4 was used in place of RM257.

Example 11

The procedures were performed to prepare an optical film in the same manner as described in Example 1, excepting that a mixture of RM257, RM23 (Formula 7), RM305 (Formula 8), and RM105 (Formula 9) (at weight ratio of 60:10:20:10) was used in place of RM257:

[Formula 7]

[Formula 8]

[Formula 9]

Example 12

The procedures were performed to prepare an optical film in the same manner as described in Example 1, excepting that RM-T709 of the following Formula 10 was used in place of RM257:

[Formula 10]

Example 13

The procedures were performed to prepare an optical film in the same manner as described in Example 1, excepting that RM-T813 of the following Formula 11 was used in place of RM257:

[Formula 11]

Example 14

The procedures were performed to prepare an optical film in the same manner as described in Example 1, excepting that RM-T7861 of the following Formula 12 was used in place of RM257:

[Formula 12]

Comparative Example 1

The procedures were performed to prepare an optical film in the same manner as described in Example 5, excepting that LC1057 of the following Formula 13 was used in place of RM257:

[Formula 13]

Comparative Example 2

The procedures were performed to prepare an optical film in the same manner as described in Example 1, excepting that a compound of the following Formula 14 was used in place of the 5-norbornene-2-ethyl-(4-benzyloxy cinnamate) polymer:

[Formula 14]

In the Formula 14, CelAc represents cellulose acetate.

Comparative Example 3

The procedures were performed to prepare an optical film in the same manner as described in Example 1, excepting that a compound of the following Formula 15 was used in place of the 5-norbornene-2-ethyl-(4-benzyloxy cinnamate) polymer:

[Formula 15]

In the Formula 15, Cel represents cellulose.

Comparative Example 3

The procedures were performed to prepare an optical film in the same manner as described in Example 1, excepting that a compound of the following Formula 16 was used in place of the 5-norbornene-2-ethyl-(4-benzyloxy cinnamate) polymer:

[Formula 16]

In the Formula 16, CelAc represents cellulose acetate.

EXPERIMENTAL EXAMPLES

Experimental Example 1: Evaluation of Liquid Crystal Alignment (Degree of Light Leakage)

Between two polarizing plates arranged at right angles to each other was placed each of the optical films of Examples 1 to 14 and Comparative Examples 1 to 4. Then, ECLIPSE LV100POL (manufactured by NIKON) was used to take an image showing the degree of light leakage.

Figure 2:
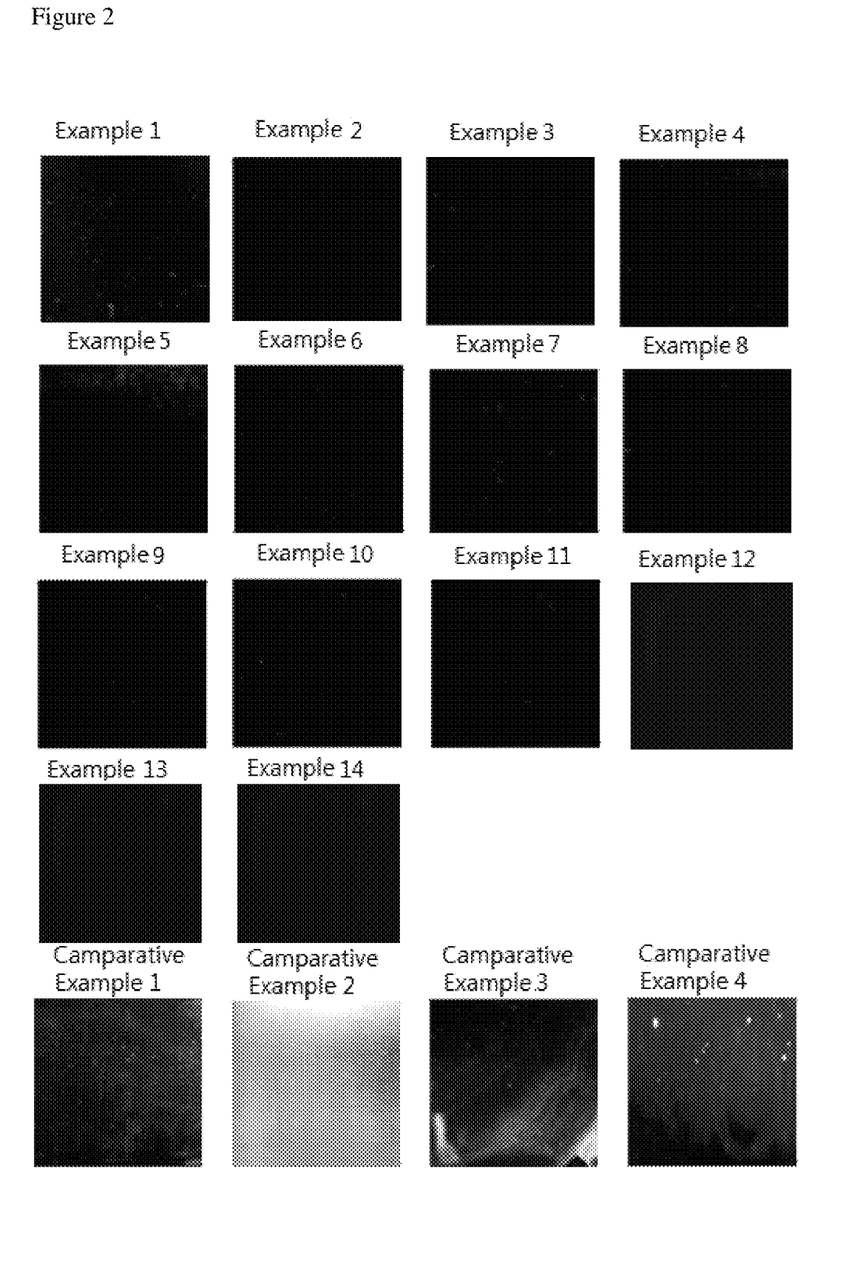
FIG. 2 presents images showing light leakage of the optical films according to Examples 1 to 14 and Comparative Examples 1 to 4.

FIG. 2 presents images showing the light leakage of the respective optical films according to Examples 1 to 14 and Comparative Examples 1 to 4.

Referring to FIG. 2, the optical films according to the present invention scarcely had light leakage, while the optical films of the comparative examples showed considerable light leakage.

Experimental Example 2: Evaluation of Photoreactivity

The FT-IR spectra of the respective optical films prepared in Examples 1 to 14 and Comparative Examples 1 to 14 were observed. The optical films were evaluated in regards to photoreactivity based on the time $t_{1/2}$ required to halve the intensity of the C=C bond stretching mode of the cinnamate group in the polymer upon exposure to a mercury lamp with an intensity of 20 mW/cm² and the energy value ($E_{1/2}$=20 mW/cm²×$t_{1/2}$) reduced from the time $t_{1/2}$.

The evaluation results are presented in Table 1.

TABLE 1

|  | $t_{1/2}$ (unit: minute) | $E_{1/2}$ (unit: J/cm²) |
| --- | --- | --- |
| Example 1 | 0.9 | 1.3 |
| Example 2 | 0.9 | 1.2 |
| Example 3 | 1.0 | 1.2 |
| Example 4 | 1.0 | 1.0 |
| Example 5 | 0.9 | 1.6 |
| Example 6 | 1.1 | 1.0 |
| Example 7 | 1.0 | 1.0 |
| Example 8 | 1.0 | 1.1 |
| Example 9 | 1.1 | 1.2 |
| Example 10 | 1.0 | 1.6 |
| Example 11 | 1.2 | 1.4 |
| Example 12 | 0.9 | 1.5 |
| Example 13 | 1.2 | 2.0 |
| Example 14 | 0.9 | 1.7 |
| Comparative Example 1 | 2.7 | 7.7 |
| Comparative Example 2 | 20.1 | 24.1 |
| Comparative Example 3 | 9.3 | 11.2 |
| Comparative Example 4 | 4.5 | 5.4 |

Referring to Table 1, the optical films prepared according to the examples of the present invention were superior in photoreactivity to those of the comparative examples.

DESCRIPTION OF REFERENCE NUMERALS

10: Second optically anisotropic layer
20: First optically anisotropic layer
100: Optical film

What is claimed is:
1. An optical film comprising:
a first optically anisotropic layer comprising at least one liquid crystal compound selected from the group consisting of the following Formulae 10 to 12; and
a second optically anisotropic layer comprising a photoreactive polymer including a repeating unit represented by the following Formula 2a or 2b, wherein the second optically anisotropic layer is a photo-alignment layer;

[Formula 10]

[Formula 11]

[Formula 12]

[Formula 2a]

[Formula 2b]

wherein independently, q is an integer from 0 to 4;

m is an integer from 50 to 5,000; and at least one of R1, R2, R3 and R4 is any one selected from the group consisting of radicals of the following Formula 3a or 3b, among the R1 to R4, the remainders other than the radical of the Formula 3a or 3b are the same as or different from one another and independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; and a polar functional group comprising at least one of oxygen, nitrogen, phosphor, sulfur, silicon, and boron, when the R1 to R4 are not hydrogen, halogen, or a polar functional group, at least one selected from the group consisting of a R1 and R2 coordination and a R3 and R4 coordination is bonded together to form an alkylidene group having 1 to 10 carbon atoms; or R1 or R2 is bonded to either R3 or R4 to form a saturated or unsaturated aliphatic ring having 4 to 12 carbon atoms or an aromatic ring having 6 to 24 carbon atoms,

[Formula 3a]

[Formula 3b]

wherein A is simple bond, oxygen, sulfur, or —NH—;

B is selected from the group consisting of simple bond, substituted or unsubstituted alkylene having 1 to 20 carbon atoms, carbonyl, carboxy, ester, substituted or unsubstituted arylene having 6 to 40 carbon atoms, and substituted or unsubstituted heteroarylene having 6 to 40 carbon atoms;

X is oxygen or sulfur;

R9 is selected from the group consisting of simple bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted aralkylene having 7 to 15 carbon atoms, and substituted or unsubstituted alkynylene having 2 to 20 carbon atoms;

at least one of R10 to R14 is a radical represented by -L-R15-R16- (substituted or unsubstituted C6-C40 aryl), among the R10 to R14, the remainders other than the radical of -L-R15-R16-(substituted or unsubstituted C6-C40 aryl) are the same as or different from one another and independently selected from the group consisting of hydrogen; halogen; substituted or unsubstituted alkyl having 1 to 20 carbon atoms; substituted or unsubstituted alkoxy having 1 to 20 carbon atoms; substituted or unsubstituted aryloxy having 6 to 30 carbon atoms; substituted or unsubstituted aryl having 6 to 40 carbon atoms; and heteroaryl having 6 to 40 carbon atoms with a hetero element in Group 14, 15 or 16;

L is selected from the group consisting of oxygen, sulfur, —NH—, substituted or unsubstituted alkylene having 1 to 20 carbon atoms, carbonyl, carboxy, —CONH—, and substituted or unsubstituted arylene having 6 to 40 carbon atoms;

R15 is substituted or unsubstituted alkyl having 1 to 10 carbon atoms; and

R16 is selected from the group consisting of simple bond, —O—, —C(=O)O—, —OC(=O)—, —NH—, —S—, and —C(=O)—.

2. The optical film as claimed in claim 1, wherein the radical of -L-R15-R16- (substituted or unsubstituted C6-C40 aryl) is represented by the following Formula 4:

[Formula 4]

wherein R15 and R16 are as defined in Formulae 3a and 3b; and

R17 to R21 are the same as or different from one another and independently selected from the group consisting of hydrogen; halogen; substituted or unsubstituted alkyl having 1 to 20 carbon atoms; substituted or unsubstituted alkoxy having 1 to 20 carbon atoms; substituted or unsubstituted aryloxy having 6 to 30 carbon atoms; substituted or unsubstituted aryl having 6 to 40 carbon atoms; heteroaryl having 6 to 40 carbon atoms with a hetero element in Group 14, 15 or 16; and substituted or unsubstituted alkoxyaryl having 6 to 40 carbon atoms.

3. The optical film as claimed in claim 1, wherein the polar functional group is selected from the group consisting of the following functional groups:

—OR$_6$, —OC(O)OR$_6$, —R$_5$OC(O)OR$_6$, —C(O)OR$_6$, —R$_5$C(O)OR$_6$, —C(O)R$_6$, —R$_5$C(O)R$_6$, —OC(O)R$_6$, —R$_5$OC(O)R$_6$, —(R$_5$O)p-OR$_6$, —(OR$_5$)p-OR$_6$, —C(O)—O—C(O)R$_6$, —R$_5$C(O)—O—C(O)R$_6$, —SR$_6$, —R$_5$SR$_6$, —SSR$_6$, —R$_5$SSR$_6$, —S(=O)R$_6$, —R$_5$S(=O)R$_6$, —R$_5$C(=S)R$_6$—, —R$_5$C(=S)SR$_6$, —R$_5$SO$_3$R$_6$, —SO$_3$R$_6$, —R$_5$N=C=S, —N=C=S, —NCO, —R$_5$—NCO, —CN, —R$_5$CN, —NNC(=S)R$_6$, —R$_5$NNC(=S)R$_6$, —NO$_2$, —R$_5$NO$_2$, tuted carbonyloxylene having 1 to 20 carbon atoms; or substituted or unsubstituted alkoxylene having 1 to 20 carbon atoms; and R6, R7 and R8 are independently selected from the group consisting of hydrogen; halogen; substituted or unsubstituted linear or branched alkyl having 1 to 20 carbon atoms; substituted or unsubstituted linear or branched alkenyl having 2 to 20 carbon atoms; substituted or unsubstituted linear or branched alkynyl having 2 to 20 carbon atoms; substituted or unsubstituted cycloalkyl having 3 to 12 carbon atoms; substituted or unsubstituted aryl having 6 to 40 carbon atoms; substituted or unsubstituted alkoxy having 1 to 20 carbon atoms; and substituted or unsubstituted carbonyloxy having 1 to 20 carbon atoms.

4. The optical film as claimed in claim 1, wherein the substituted or unsubstituted aryl having 6 to 40 carbon atoms or the heteroaryl having 6 to 40 carbon atoms with an hetero element in Group 14, 15 or 16 is selected from the group consisting of the following functional groups:

wherein independently,
p is an integer from 1 to 10;
R5 is substituted or unsubstituted linear or branched alkylene having 1 to 20 carbon atoms; substituted or unsubstituted linear or branched alkenylene having 2 to 20 carbon atoms; substituted or unsubstituted linear or branched alkynylene having 2 to 20 carbon atoms; substituted or unsubstituted cycloalkylene having 3 to 12 carbon atoms; substituted or unsubstituted arylene having 6 to 40 carbon atoms; substituted or unsubsti- -continued wherein R'10 to R'18 are the same as or different from one another and independently selected from the group consisting of substituted or unsubstituted linear or branched alkyl having 1 to 20 carbon atoms; substituted or unsubstituted alkoxy having 1 to 20 carbon atoms; substituted or unsubstituted aryloxy having 6 to 30 carbon atoms; and substituted or unsubstituted aryl having 6 to 40 carbon atoms.

5. The optical film as claimed in claim 1, wherein the photoreactive polymer including a repeating unit represented by the Formula 2a or 2b has a weight average molecular weight of 10,000 to 1,000,000.

6. The optical film as claimed in claim 1, wherein the second optically anisotropic layer comprises a composition comprising a photoreactive polymer including a repeating unit represented by the Formula 2a or 2b, a photoactivator, a (meth)acrylate-based compound, and a photoinitiator.

7. The optical film as claimed in claim 6, wherein the optical film comprises, based on the total weight of the composition, 50 to 70 wt % of the photoreactive polymer including a repeating unit represented by the Formula 2a or 2b; 1 to 20 wt % of the photoactivator; 20 to 40 wt % of the (meth)acrylate-based compound; and 1 to 15 wt % of the photoinitiator.

8. The optical film as claimed in claim 6, wherein the photoactivator comprises at least one selected from the group consisting of 2,4-ethyl-9H-thioxanthen-9-one, 1-isopropyl-9H-thioxanthen-9-one, 1,3-difluoro-9H-thioxanthen-9-one, and 2-trifluoromethyl-9H-thioxanthen-9-one.

9. The optical film as claimed in claim 6, wherein the (meth)acrylate-based compound comprises at least one selected from the group consisting of pentaerythritol triacrylate, tris(2-acrylolyloxyethyl)isocynurate, trimethylolpropane triacrylate, and dipentaerythritol hexaacrylate.

10. The optical film as claimed in claim 1, wherein the first optically anisotropic layer further comprises at least one monoacrylate-based compound.

11. The optical film as claimed in claim 10, wherein the monoacrylate-based compound is selected from the group consisting of the following compounds:

wherein z represents an integer from 2 to 12.

12. A display device comprising the optical film as claimed in claim 1.

* * * * *